A. F. JENNINGS.
Refrigerator for Milk.
No. 62,424.
Patented Feb. 26, 1867.
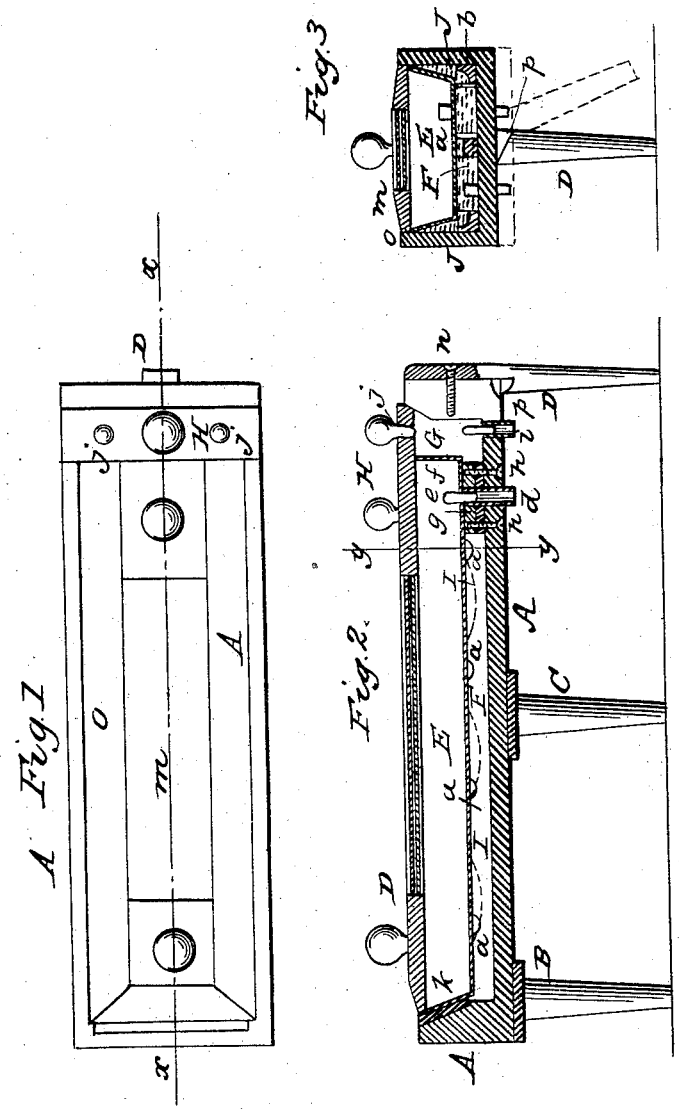

UNITED STATES PATENT OFFICE.

ALVA F. JENNINGS, OF SHERMAN, NEW YORK.

IMPROVED REFRIGERATOR FOR MILK.

Specification forming part of Letters Patent No. 62,424, dated February 26, 1867.

*To all whom it may concern:*

Be it known that I, ALVA F. JENNINGS, of Sherman, in the county of Chautauqua and State of New York, have invented certain new and useful Improvements in Refrigerators for Milk; and I hereby declare that the following is a full and exact description thereof, reference being had to the accompanying drawings, making a part of this specification, in which—

Figure 1 is a plan of my improvements. Fig. 2 is a longitudinal vertical section in the plane of line $x\,x$, Fig. 1. Fig. 3 is a transverse section in plane of line $y\,y$, Fig. 2.

Like letters of reference designate corresponding parts in all the figures.

The object of my improvements is the construction of a receptacle of sufficient capacity to hold the milk of an ordinary-sized dairy, so as to dispense with the use of common pans, and to enable the milk thereby to be readily reduced to that temperature most favorable to the proper rising of the cream, and maintaining it uniformly at such temperature; and, also, to prevent the drying up of the cream on the surface, and the deleterious effects resulting therefrom.

My invention consists of a large, shallow, rectangular wooden box, A A, with a pan, B, of corresponding form, fitting and arranged therein so as to leave a space, C, beneath the bottom of the pan, that may be filled with water, so that the latter may be immersed therein, and the said space closed air-tight, or nearly so; or the space may be partially filled with the liquid, leaving a small space between its surface and the bottom of the pan for the passage of a current of air; or said space may be employed simply for the passage of the air.

It also consists in providing the milk-pan with a cover, D, that shall prevent the undue drying up of the cream, and at the same time be sufficiently transparent to admit adequate light to develop the required color in the butter produced therefrom.

It further consists in the arrangement by which the apparatus can be readily inclined, when required, in drawing off the milk after it is skimmed and has become thick by standing.

In the drawings, A represents the rectangular wooden receptacle, which may be of a capacity varying with the size of the dairy, and which I prefer to support on five legs—two, B, at one end, two, C, near the middle, and one, D, at the other end, for a purpose presently to be explained. E is the milk-pan, of tin or other sheet metal, fitting therein, as shown, which may vary in depth; but from four to six inches, or that of an ordinary pan, is sufficient, while the space F, between its bottom and that of the wooden one beneath, need not necessarily exceed two inches.

The sides of the milk-pan should incline inward toward the bottom, and the upper edge thereof fit tightly within the outer box. Its length is a little less than that of the box A, so as to leave an open space, G, at one end, which is provided with a closely-fitting cover, H.

Extending longitudinally under the center of the pan, and secured in any suitable way thereto, is the wooden piece I I, which rests upon the bottom of the receptacle A, supporting the pan, and also imparting to it an increased stiffness when it is required, from any cause, to be removed from its bed A. Its upper surface, in contact with the pan, may be recessed at intervals, $a\,a$, to allow the free circulation and action of the water or other fluid.

The sides of the pan rest upon ledges J J, the corners of which are also at intervals cut away to form passages $b\,b$ for the water around the sides of the pan, as shown in Fig. 3.

One end of the pan is provided with a pipe, $d$, passing downward through the bottom of A, and provided with a suitable plug or stopper, $e$, through which the skimmed milk can be drawn off. The joint made by its passage through the bottom of the box may be prevented from leaking by means of a block of wood, $f$, secured tightly to the bottom of the pan, to which is attached the rubber or other packing $g$, which is secured tightly to the bottom A by screws $h\,h$, as clearly shown in Fig. 2. The receptacle A at the same end is also provided with an opening and plug, $i$, through which its contents can be discharged when desired.

The cover H has two apertures, $j\,j$, (closed when required by suitable plugs,) for the admission or escape of the air, as will hereinafter be explained. The opposite end of the box A is provided with a recess and slide, $k$, for a purpose similar to that of the apertures $j\,j$.

The pan may be secured to the bottom of the receptacle A, if desired, by screws, which pass up through the latter into the longitudinal piece I I, Fig. 2.

The milk-pan is provided with a tightly-fitting cover, O, the central portion $m$ being of glass, constructed of two thicknesses, as shown, leaving a non-conducting space between the two.

The leg D is pivoted to the end of the box by a screw, $n$, and having a bevel or inclined shoulder, $p$, as shown in Figs. 2 and 3.

The apparatus is inclined, when required, by turning the leg D to one side till the face of the shoulder $p$ comes in contact with the bottom of the former, acting as a stop to any further movement, as shown in Fig. 3, which allows the apparatus to incline by balancing on the center legs, the preponderance being toward the end to which the leg D is attached, as shown in Fig. 3.

My improvements thus constructed are employed in the manner and with the advantages following.

In very warm weather, when the temperature of the milk-room is much above that (about 62° Fahrenheit) required for the milk, the various apertures being closed, cold water, with the addition of ice, if necessary, is introduced into the space G at the end, filling the space beneath the pan and at the sides, as shown in Fig. 3, when the cover H is replaced, which renders the water-space nearly air-tight. The warm milk is now poured into the pan, which is left uncovered for a few minutes, till the milk has been reduced to about the temperature required, which is rapidly effected, when the pan is closed by the cover O, which thereby prevents the free access of the warm external air, so that both the water and milk are in a great measure protected from the effect of a warm atmosphere. By these means the uniform temperature of the milk is easily maintained and kept but a few degrees above that of the water in the space beneath.

The temperature of the water is readily ascertained by introducing a thermometer in it in the space G.

The water, as it becomes warm, can be drawn off through the pipe $d$, and fresh supplied, or more ice can be introduced, as most convenient.

When the weather is not so warm, the immersion of the milk-pan in the cold water might produce too great a reduction of temperature. In such case the water-space need only be partially filled, leaving a small space above the water for the circulation of the air, which is produced by removing the cover H and withdrawing the slide $k$ at the opposite ends. There may be days when the circulation of the air under the pan will sufficiently diminish the temperature without the use of water.

In cold weather, when the temperature is below that required for the milk, warm water can be supplied to the apparatus with equally beneficial results.

It is essential that the milk remain undisturbed till after the separation of the cream. My improved pan, being secured firmly to the receptacle A, which is steadily supported on its five legs, as before described, also insures this result; and it is not required to be inclined till the cream has been removed.

The drying up of the cream on the surface by evaporation during dry weather, and especially in the fall, is one of the most serious difficulties that butter-makers have to overcome, no device heretofore, to my knowledge, having ever been employed to prevent such a result. The use of the cover O affords complete protection against this difficulty, by shielding the milk from the drying effects of the air, and thereby not only utilizing a large amount of cream that would otherwise be wasted, but also avoids the great loss which results from the dried flakes of cream becoming incorporated in the butter, which produces a flocky and bad appearance, and, by its tendency to decomposition, renders the whole rancid and comparatively worthless.

By removing the animal heat soon after it is drawn from the cow, and maintaining the milk at a uniform and proper temperature, it does not sour until all the cream has had time to rise, thus effecting a saving, in amount, of about twenty per cent., and making a better quality of butter.

The transparent center of the cover permits the necessary admission of light, so that the color of the butter may not be impaired, as would be the case if light were entirely excluded.

The use of a single large pan effects a great saving of the cream, which results from its adhering to the sides of the pans, as by my improvement the amount of such surface exposed to adhesion is greatly diminished.

What I claim as my invention, and desire to secure by Letters Patent, is—

1. The combination, with the sheet-metal pan E and its inclosing wooden case A, of the bar I I, attached to the bottom of said pan, and removable therewith, constructed and arranged substantially as and for the purposes set forth.

2. In combination with the pan E and refrigerating-case A, the cover O, provided with a transparent center, $m$, of double thickness, in the manner and for the purposes described.

3. The combination of the adjustable leg D with the milk-pan receptacle A and stationary legs D C, arranged and operating as and for the purpose specified.

4. In combination with the pan E and its receptacle A, the removable slide $k$ and plug-orifices $jj$ of the cover H, for forming a passage for the circulation of air under and around the pan after the milk is sufficiently cooled with ice or water, substantially as set forth.

In witness whereof I have hereunto signed my name in the presence of two subscribing witnesses.

ALVA F. JENNINGS.

Witnesses:
JAY HYATT,
J. R. DRAKE.